G. F. BULL
POWER DRIVEN LAWN MOWER, ROLLER, AND THE LIKE.
APPLICATION FILED JULY 8, 1921.

1,419,916.

Patented June 20, 1922.

INVENTOR
George Frederick Bull
BY
ATTORNEYS.

UNITED STATES PATENT OFFICE.

GEORGE F. BULL, OF BIRMINGHAM, ENGLAND, ASSIGNOR OF ONE-HALF TO CHARLES H. PUGH, LIMITED, OF BIRMINGHAM, ENGLAND.

POWER-DRIVEN LAWN MOWER, ROLLER, AND THE LIKE.

1,419,916.     Specification of Letters Patent.    Patented June 20, 1922.

Application filed July 8, 1921. Serial No. 483,125.

*To all whom it may concern:*

Be it known that I, GEORGE FREDERICK BULL, subject of the King of Great Britain, residing at Birmingham, England, have invented certain new and useful Improvements in Power-Driven Lawn Mowers, Rollers, and the like, of which the following is a specification.

This invention relates to power-driven lawn-mowers, rollers and the like. The invention relates more particularly however, to the rollers of power driven lawn-mowers, and has for its object to provide an improved construction of roller which is capable of more readily moving round curves or corners.

Hitherto the rollers of a lawn-mower have usually been divided vertically into two members, both of which have been positively driven from the engine, and where such rollers have been of a considerable length it has been impossible readily to turn corners or sharp angles.

According to the present invention the roller is divided vertically into three members, the middle member only of which is positively driven from the engine, whilst the other roller members are normally free to rotate upon the driving shaft, means being preferably provided for locking same to the latter when desired, for instance where they have to traverse uneven ground.

Figure 1:
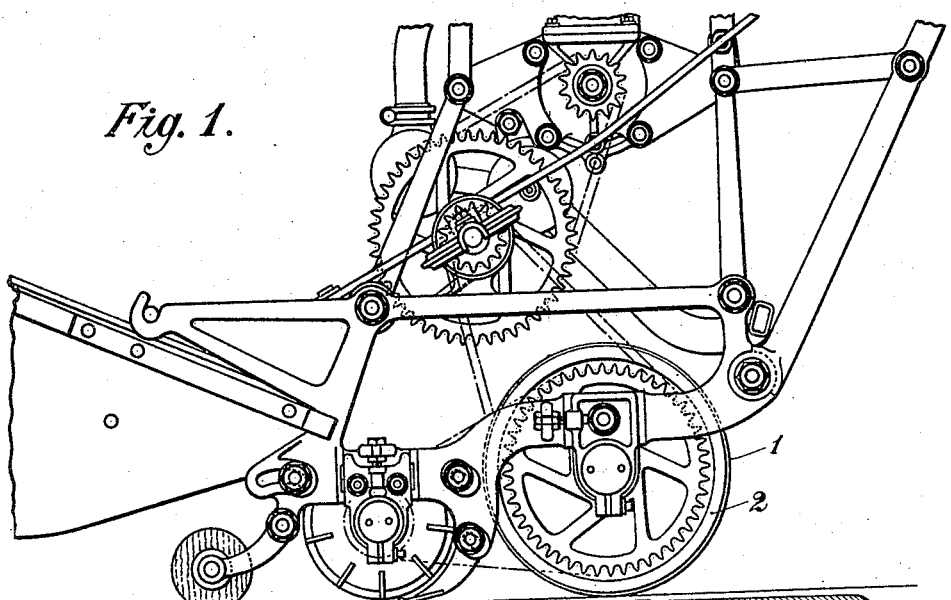
Figure 1 is a side elevation of the machine.
Figure 2:
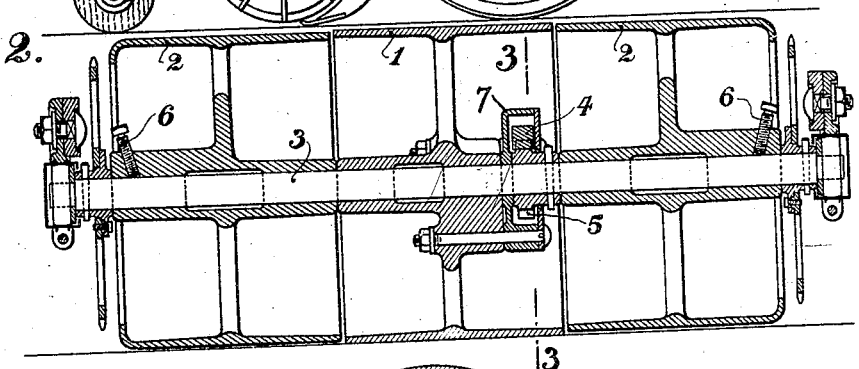
Figure 2 is a longitudinal section through the rollers.
Figure 3:
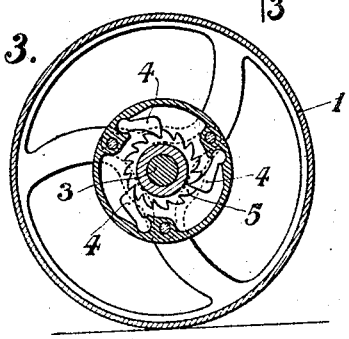
Figure 3 is a section upon the line 3—3 Figure 2.

Thus, in carrying out the invention, the roller of the lawn-mower is divided vertically into three members. The middle roller member 1 is preferably of a slightly larger diameter than the two end members 2, 2 and is mounted upon a transverse driving shaft 3 geared up with the engine. The said middle roller has bolted to it a drum 7 which carries pawls 4 upon its inside, which pawls are arranged to engage with a ratchet wheel 5 carried by the driving shaft, so that the motion of the latter is positively transmitted to the roller in the one direction, the pawl, however, wiping over the teeth of the ratchet wheel in the other direction to allow of the roller being moved freely in one direction. The two end rollers 2, 2 are mounted so as to be free to rotate upon the driving shaft, although they may be locked to the latter by means of set-screws 6, 6, when desired; for instance, when they are to be moved over very uneven ground.

If desired the inside periphery of the centre roller or of the drum 7 may be formed with ratchet teeth arranged to engage with a pawl upon the driving shaft, so that the roller is positively driven in the one direction; or any other suitable means may be provided for driving the centre roller for the shaft.

Besides being applicable to the rollers of power driven mowing-machines, the invention is equally applicable to other rollers.

Having fully described my invention, what I desire to claim and secure by Letters Patent is:—

1. A power driven lawn mower having a driving shaft, two end roller members mounted upon the shaft and a centre roller member also mounted thereon which is of slightly larger diameter than the end rollers; in combination with means for positively driving the centre roller member only from the shaft, means for normally allowing the two end members to rotate freely upon the driving shaft and means for locking the end rollers to the said shaft if desired.

2. A power driven lawn-mower having a driving shaft, two end roller members mounted upon the shaft and a centre roller member also mounted thereon which is of slightly larger diameter than the end rollers; in combination with means for positively driving the centre roller member only from the shaft, means whereby the said centre roller member is able to overrun the driving shaft if necessary, means for normally allowing the two end roller members to rotate freely upon the shaft and means for locking the end roller members to the said shaft if desired.

3. A power-driven lawn-mower having a driving shaft, two end roller members freely mounted upon the shaft and a centre roller member also mounted thereon which is of slightly larger diameter than the end rollers; in combination with a pawl and ratchet device whereby the centre roller is always positively driven by the shaft but is permitted to overrun the same if necessary, and set screws whereby the end rollers can be locked to the shaft if desired.

In testimony whereof I have hereunto set my hand in presence of two subscribing witnesses.

GEO. F. BULL.

Witnesses:
W. S. SKERRETT,
W. H. SKERRETT.